United States Patent
Suyama et al.

(10) Patent No.: US 11,574,631 B2
(45) Date of Patent: Feb. 7, 2023

(54) DEVICE CONTROL SYSTEM, DEVICE CONTROL METHOD, AND TERMINAL DEVICE

(71) Applicant: YAMAHA CORPORATION, Hamamatsu (JP)

(72) Inventors: Akihiko Suyama, Hamamatsu (JP); Kazuya Mushikabe, Hamamatsu (JP); Keisuke Tsukada, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 82 days.

(21) Appl. No.: 16/888,279

(22) Filed: May 29, 2020

(65) Prior Publication Data

US 2020/0294494 A1    Sep. 17, 2020

Related U.S. Application Data

(63) Continuation of application No. PCT/JP2018/042864, filed on Nov. 20, 2018.

(30) Foreign Application Priority Data

Dec. 1, 2017    (JP) .............................. JP2017-231631

(51) Int. Cl.
*G10L 15/22* (2006.01)
*G10L 15/19* (2013.01)

(52) U.S. Cl.
CPC .............. *G10L 15/19* (2013.01); *G10L 15/22* (2013.01); *G10L 2015/223* (2013.01); *G10L 2015/228* (2013.01)

(58) Field of Classification Search
USPC .......................... 704/246, 247, 251, 252, 257
See application file for complete search history.

(56) References Cited

U.S. PATENT DOCUMENTS

| | | | |
|---|---|---|---|
| 5,903,871 A | 5/1999 | Terui |
| 7,234,115 B1 | 6/2007 | Sprauve |
| 7,366,498 B2 | 4/2008 | Ko |
| 7,869,577 B2 | 1/2011 | Arnison |
| 7,983,399 B2 | 7/2011 | Arnison |
| 8,438,218 B2 | 5/2013 | Han |
| 8,520,807 B1 | 8/2013 | Hewinson |
| 8,595,319 B2 | 11/2013 | Hao |

(Continued)

FOREIGN PATENT DOCUMENTS

| | | |
|---|---|---|
| EP | 3232160 A1 | 10/2017 |
| JP | H09288500 A | 11/1997 |

(Continued)

OTHER PUBLICATIONS

English translation of Written Opinion issued in Intl. Appln. No. PCT/JP2018/042864 dated Jan. 8, 2019, previously cited in IDS filed May 29, 2020.

(Continued)

*Primary Examiner* — Leonard Saint-Cyr
(74) *Attorney, Agent, or Firm* — Rossi, Kimms & McDowell LLP

(57) ABSTRACT

Provided is a device control system configured to: acquire user setting relating to a device; generate a phrase for controlling the device based on the acquired user setting; and output data for displaying the generated phrase.

12 Claims, 15 Drawing Sheets

(56) References Cited

U.S. PATENT DOCUMENTS

| | | |
|---|---|---|
| 9,094,363 B1 | 7/2015 | Lin |
| 9,220,012 B1 | 12/2015 | Inamdar |
| 9,281,958 B2 | 3/2016 | Lee |
| 9,479,496 B2 | 10/2016 | Semba |
| 9,544,310 B2 | 1/2017 | Gordon |
| 9,892,732 B1 | 2/2018 | Tian |
| 9,900,730 B2 | 2/2018 | Kuroda |
| 10,341,336 B2 | 7/2019 | An |
| 10,623,198 B2 | 4/2020 | Lin |
| 10,679,608 B2 | 6/2020 | Mixter |
| 2002/0071577 A1 | 6/2002 | Lemay |
| 2004/0015573 A1 | 1/2004 | Yuki |
| 2004/0088535 A1* | 5/2004 | Jones ............... G06F 9/44505 713/100 |
| 2005/0009498 A1 | 1/2005 | Ho |
| 2005/0226595 A1* | 10/2005 | Kreifeldt ............ H04H 60/04 386/231 |
| 2006/0193292 A1 | 8/2006 | Bansal |
| 2007/0091168 A1 | 4/2007 | Lee |
| 2007/0130337 A1 | 6/2007 | Arnison |
| 2007/0256027 A1* | 11/2007 | Daude ............... G06F 3/038 715/810 |
| 2008/0263654 A1 | 10/2008 | Bahl |
| 2009/0089065 A1* | 4/2009 | Buck ............... G10L 15/26 704/275 |
| 2009/0204410 A1* | 8/2009 | Mozer ............... G10L 15/30 704/275 |
| 2010/0083352 A1 | 4/2010 | Arnison |
| 2010/0328133 A1 | 12/2010 | Nojima |
| 2011/0119063 A1 | 5/2011 | Arnison |
| 2012/0077545 A1 | 3/2012 | Kim |
| 2012/0206233 A1 | 8/2012 | Kamiya |
| 2012/0300018 A1 | 11/2012 | Li |
| 2013/0115927 A1 | 5/2013 | Gruber |
| 2013/0158980 A1 | 6/2013 | Landry |
| 2013/0311180 A1 | 11/2013 | Arnison |
| 2013/0322634 A1 | 12/2013 | Benneii |
| 2014/0149118 A1* | 5/2014 | Lee ............... G10L 15/22 704/251 |
| 2014/0277644 A1* | 9/2014 | Gomes-Casseres .... G06F 16/60 700/94 |
| 2014/0330560 A1 | 11/2014 | Venkatesha |
| 2014/0330569 A1 | 11/2014 | Kolavennu |
| 2014/0351847 A1 | 11/2014 | Ochiai |
| 2015/0046580 A1* | 2/2015 | Sasagawa ........ G06Q 30/0255 709/224 |
| 2015/0053781 A1* | 2/2015 | Nelson ............... G10L 15/22 236/1 C |
| 2015/0178099 A1 | 6/2015 | Diester |
| 2015/0206529 A1* | 7/2015 | Kwon ............... G10L 17/22 704/246 |
| 2015/0215315 A1 | 7/2015 | Gordon |
| 2015/0243287 A1 | 8/2015 | Nakano |
| 2015/0254057 A1 | 9/2015 | Klein |
| 2015/0294666 A1* | 10/2015 | Miyasaka ............ G10L 17/22 704/251 |
| 2015/0324706 A1* | 11/2015 | Warren ............... G05B 15/02 700/275 |
| 2015/0348551 A1 | 12/2015 | Gruber |
| 2015/0379993 A1 | 12/2015 | Subhojit |
| 2016/0164694 A1 | 6/2016 | Hyun |
| 2016/0221363 A1 | 8/2016 | Bae |
| 2016/0267913 A1 | 9/2016 | Kim |
| 2016/0291925 A1 | 10/2016 | Kohara |
| 2016/0360347 A1 | 12/2016 | Kuroda |
| 2017/0006026 A1 | 1/2017 | An |
| 2017/0097618 A1 | 4/2017 | Cipollo |
| 2017/0111423 A1 | 4/2017 | Cui |
| 2017/0125035 A1 | 5/2017 | Gao |
| 2017/0164065 A1 | 6/2017 | Aggarwal |
| 2017/0230705 A1 | 8/2017 | Pardue |
| 2017/0264451 A1 | 9/2017 | Yu |
| 2017/0279949 A1 | 9/2017 | Takahashi |
| 2017/0331807 A1 | 11/2017 | Mont-Reynaud |
| 2017/0344732 A1 | 11/2017 | Kohli |
| 2018/0007210 A1 | 1/2018 | Todasco |
| 2018/0014480 A1 | 1/2018 | Montgomery |
| 2018/0047394 A1 | 2/2018 | Tian |
| 2018/0048479 A1 | 2/2018 | Lin |
| 2018/0068663 A1 | 3/2018 | Choi |
| 2018/0107445 A1 | 4/2018 | Ohmura |
| 2018/0137858 A1 | 5/2018 | Saxena |
| 2018/0170242 A1* | 6/2018 | Wang ............... H04L 67/125 |
| 2018/0174581 A1* | 6/2018 | Wang ............... G10L 13/02 |
| 2018/0182399 A1 | 6/2018 | Suyama |
| 2018/0190264 A1 | 7/2018 | Mixter |
| 2018/0191670 A1 | 7/2018 | Suyama |
| 2018/0196630 A1 | 7/2018 | Kohara |
| 2018/0204575 A1 | 7/2018 | Huang |
| 2018/0277119 A1 | 9/2018 | Baba |
| 2018/0332033 A1 | 11/2018 | Lakhani |
| 2018/0336359 A1 | 11/2018 | Lakhani |
| 2019/0089550 A1 | 3/2019 | Rexach |
| 2019/0115017 A1 | 4/2019 | Sim |
| 2019/0123897 A1 | 4/2019 | Adams |
| 2019/0173834 A1 | 6/2019 | Suyama |
| 2019/0229945 A1 | 7/2019 | Suyama |
| 2019/0259386 A1 | 8/2019 | Kudurshian |
| 2019/0341033 A1 | 11/2019 | Hammons |
| 2019/0341037 A1 | 11/2019 | Bromand |
| 2019/0341038 A1 | 11/2019 | Bromand |
| 2020/0104094 A1 | 4/2020 | White |

FOREIGN PATENT DOCUMENTS

| | | |
|---|---|---|
| JP | 2001128262 A | 5/2001 |
| JP | 2002202826 A | 7/2002 |
| JP | 2002259114 A | 9/2002 |
| JP | 2004015627 A | 1/2004 |
| JP | 2004507936 A | 3/2004 |
| JP | 2005109763 A | 4/2005 |
| JP | 2008533935 A | 8/2008 |
| JP | 2015100085 A | 5/2015 |
| JP | 2015106358 A | 6/2015 |
| JP | 2017028586 A | 2/2017 |
| JP | 2017167627 A | 9/2017 |

OTHER PUBLICATIONS

International Preliminary Report on Patentability issued in Intl. Appln. No. PCT/JP2018/042864 dated Jun. 11, 2020. English translation provided.

International Search Report issued in Intl. Appln. No PCT/JP2018/042864 dated Jan. 8, 2019. English translation provided.

Written Opinion issued in Intl. Appln. No. PCT/JP2018/042864 dated Jan. 8, 2019.

International Search Report issued in Intl. Appln. No. PCT/JP2016/089215 dated Mar. 28, 2017. English translation provided.

Written Opinion issued in Intl. Appln. No. PCT/JP2016/089215 dated Mar. 28, 2017. English translation provided.

Office Action issued in U.S. Appl. No. 16/205,783 dated Jan. 27, 2020.

Office Action issued in U.S. Appl. No. 16/205,783 dated May 14, 2020.

Office Action issued in U.S. Appl. No. 16/255,259 dated May 20, 2020.

Office Action issued in U.S. Appl. No. 15/908,379 dated Apr. 8, 2019.

International Preliminary Report on Patentability issued in Intl. Appln. No. PCT/JP2016/089215 dated Jul. 11, 2019. English translation provided.

Office Action issued in Japanese Appln. No. 2018-558642 dated Jan. 7, 2020. English translation provided.

Notice of Allowance issued in U.S. Appl. No. 15/908,379 dated Aug. 5, 2019.

Extended European Search Report issued in European Appln. No. 18884611.7 dated Jul. 26, 2021.

Office Action issued in U.S. Appl. No. 16/205,783 dated Aug. 19, 2020.

(56) References Cited

OTHER PUBLICATIONS

Notice of Allowance issued in U.S. Appl. No. 16/255,259 dated Sep. 23, 2020.
Office Action issued in Japanese Appln. No. 2017-231630 dated Oct. 5, 2021. Computer generated English translation provided.
Office Action issued in Japanese Appln. No. 2018-009918 dated Nov. 9, 2021 Computer generated English translation provided.
Office Action issued in Japanese Patent Application No. 2017-231630 dated May 10, 2022. English translation provided.

* cited by examiner

FIG.2

USER ID: U2

USER ID: U1

| ID | NAME | DEVICE ID | IP ADDRESS | COMMAND TYPE | TERMINALS | CONNECTION DESTINATION | RECEPTION AVAILABILITY | ACCEPTABLE COMMAND |
|---|---|---|---|---|---|---|---|---|
| 1 | Living room (FIRST DEVICE) | aabbccddee11 | 192.168.0.2 | — | AUX<br>HDMI1<br>HDMI2<br>HDMI3 | | 1 | Power<br>Volume<br>Mute |
| 3 | TV (SECOND DEVICE) | aabbccddee33 | 192.168.0.3 | — | — | aabbccddee11<br>HDMI1 | 0 | Power<br>Volume<br>Mute |
| 4 | BD Player (THIRD DEVICE) | aabbccddee44 | 192.168.0.4 | — | — | aabbccddee11<br>HDMI2 | 0 | Power |
| ... | ... | ... | ... | ... | ... | ... | ... | ... |

FIG.4

```
{
    "uid": "U1"
    "type": "cmd",
    "id":1,
    "command": {
      "ip": "192.168.0.2",
      "path": "/ctrl?power=on",
      "method":"GET"
    }
}
```
~D1

FIG.6

| USER ID | REGISTRATION FOR FIRST TYPE | REGISTRATION FOR SECOND TYPE |
|---|---|---|
| U1 | YES | YES |
| U2 | YES | NO |

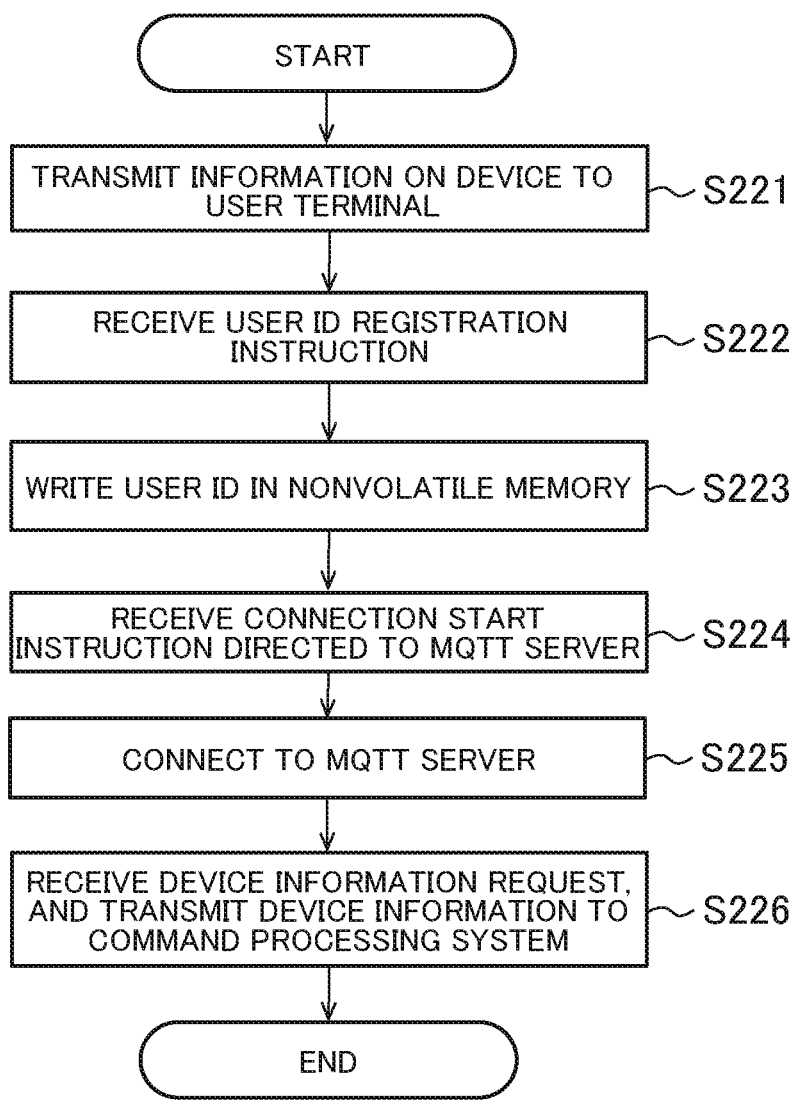

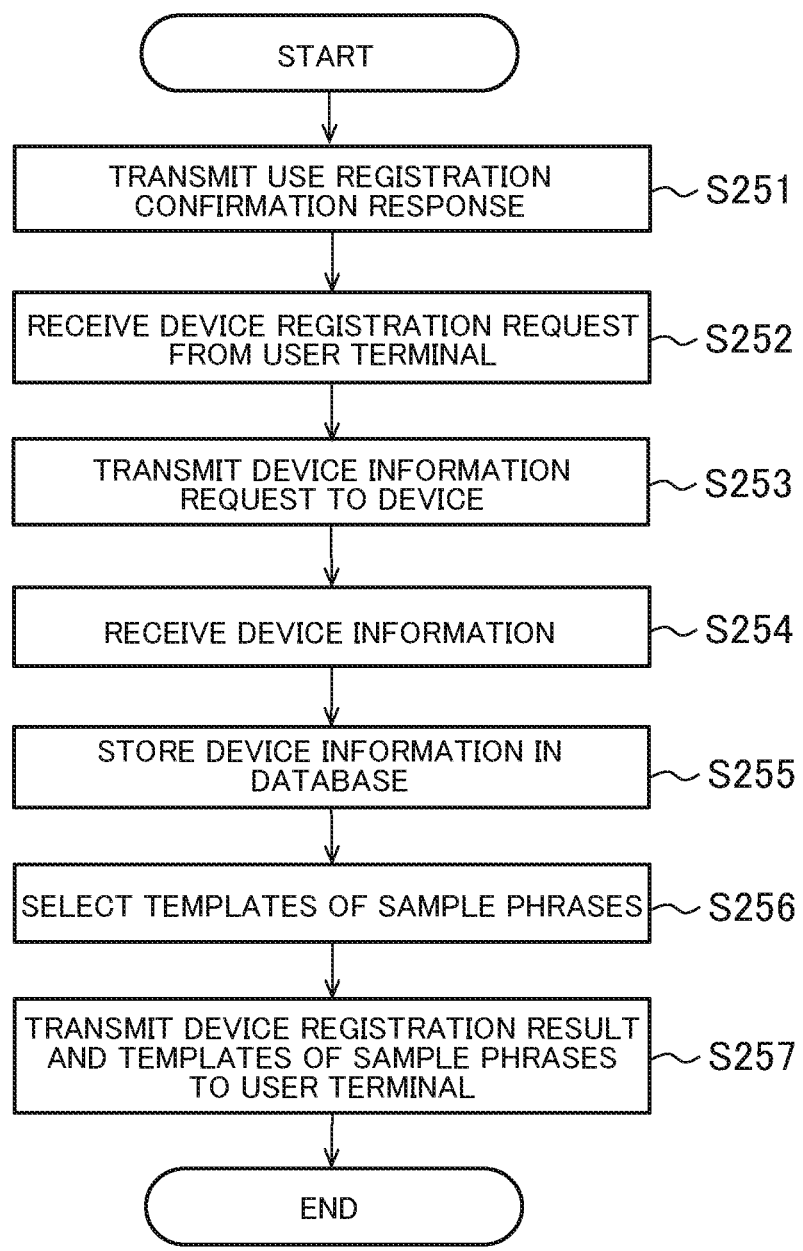

FIG.11

```
{
  "response_code": 0,
  "enabled_flags" : ["custom", "smart_home"],
  "things_to_try": [
    {
      "skill_name":"custom",
      "translations" : [
        {
          "language":"en",
          "sentence_list":                                          JP1
          [
            {"sentence" : "¥"AAA, ask MC to play Recents in the %s¥""},
            {"sentence" : "¥"AAA, ask MC to turn the volume up in the %s¥"",
              "feature" : "volume"},
            {"sentence" : "¥"AAA, ask MC to turn off the %s¥""}
          ]
        }
      ]
    },
    {
      "skill_name":"smart_home",
      "translations" : [
        {
          "language":"en",
          "sentence_list":[                                         JP2
            {"sentence" : "¥"AAA, turn on the %s¥""},
            {"sentence" : "¥"AAA, turn the volume up in the %s¥"",
             "feature" : "volume"},
            {"sentence" : "¥"AAA, turn off the %s¥""}
          ]
        }
      ]
    }
  ]
}
```

FIG.13

Things to Try

"AAA, ask MC to play Recents in the Living Room"

"AAA, ask MC to turn the volume up in the Living Room"

"AAA, ask MC to turn off the Living Room"

FIG.14

Try saying following phrases.

"AAA, turn on the Living Room"

"AAA, turn the volume up in the Living Room"

"AAA, turn off the Living Room"

DEVICE CONTROL SYSTEM, DEVICE CONTROL METHOD, AND TERMINAL DEVICE

CROSS-REFERENCE TO RELATED APPLICATION

The present application is continuation of International Application No. PCT/JP2018/042864 filed on Nov. 20, 2018, which claims priority from Japanese Application No. JP 2017-231631 filed on Dec. 1, 2017. The contents of these applications are hereby incorporated by reference into this application.

BACKGROUND OF THE INVENTION

1. Field of the Invention

The present invention relates to a device control system, a device control method, and a terminal device.

2. Description of the Related Art

In recent years, there have been an increasing number of devices, such as smartphones and smart speakers, which are easily operable, without physical operations, through speech input using speech recognition.

In the speech input, some phrase is input as an instruction. A sentence containing the phrase to be input has basically a high degree of freedom. A user thus does not know what phrases are acceptable as the speech input. In view of this, a method of providing manuals describing the acceptable phrases is conceivable, but the user can be guided to only fixed phrases. Therefore, there has been a problem in that, while the user can be guided to phrases common to all users, the user cannot be guided to phrases that change in accordance with a user.

SUMMARY OF THE INVENTION

The present invention has been made in view of the above-mentioned problem, and therefore has an object to provide a technology that allows a user to easily and reliably acquire phrases acceptable in speech input.

In order to solve the above-mentioned problem, a device control system according to the present invention includes: at least one processor; and at least one memory device that stores a plurality of instructions, which when executed by the at least one processor, causes the at least one processor to operate to: acquire user setting relating to a device; generate a phrase for controlling the device based on the acquired user setting; and output data for displaying the generated phrase.

Moreover, a device control method according to the present invention includes: acquiring user setting relating to a device; generating a phrase for controlling the device based on the acquired user setting; and outputting data for displaying the generated phrase.

Moreover, a program according to the present invention causes a computer to function as: setting acquisition means for acquiring user setting relating to a device; phrase generation means for generating a phrase for controlling the device based on the acquired user setting; and display data output means for outputting data for displaying the generated phrase.

According to at least one embodiment of the present invention, the user can easily acquire phrases acceptable in the speech input.

BRIEF DESCRIPTION OF THE DRAWINGS

FIG. 2 is a diagram for illustrating an example of device tables.

FIG. 4 is a diagram for illustrating an example of a message.

FIG. 6 is a table for showing an example of a speech input use table.

FIG. 9 is a flowchart for illustrating an example of processing by the device in the device registration.

FIG. 10 is a flowchart for illustrating an example of processing by the command data transmission device in the device registration.

FIG. 11 is a diagram for illustrating an example of templates of sample phrases.

FIG. 13 is a diagram for illustrating an example of displayed sample phrases.

FIG. 14 is a diagram for illustrating another example of the displayed sample phrases.

DETAILED DESCRIPTION OF THE INVENTION

Description is now made of an example of at least one embodiment of the present invention with reference to the drawings.

Figure 1:
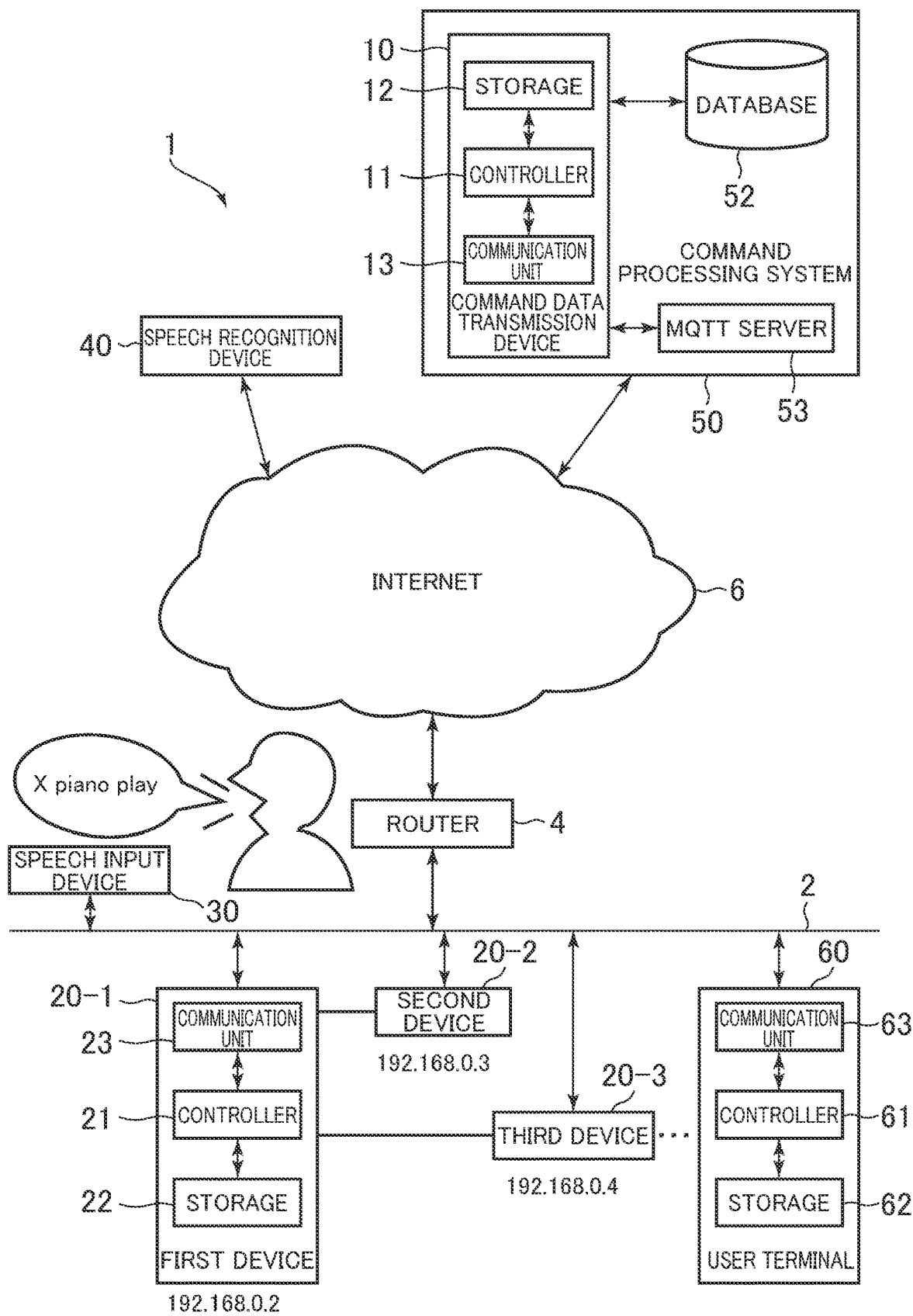
FIG. 1 is a diagram for illustrating a configuration of a device control system according to at least one embodiment of the present invention.

[1. System Configuration] FIG. 1 is a diagram for illustrating a configuration of a device control system according to at least one embodiment of the present invention. As illustrated in FIG. 1, the device control system 1 includes a first device 20-1, a second device 20-2, a third device 20-3, a speech input device 30, a speech recognition device 40, and a command processing system 50. The first device 20-1, the second device 20-2, and the third device 20-3 are hereinafter sometimes generally referred to as "devices 20"

The devices 20 and the speech input device 30 are installed in a local area, and are connected to a LAN 2. The LAN 2 may be a wired LAN or a wireless LAN. The LAN 2 is connected to an Internet 6 through a router 4. The speech recognition device 40 and the command processing system 50 are installed outside the local area. In other words, the speech recognition device 40 and the command processing system 50 are installed on the Internet 6 side as viewed from the devices 20 and the speech input device 30. The "local area" is an area having a limited range in which communication through the LAN 2 is available.

The devices 20 are devices to be controlled by the device control system 1. Although the three devices 20 are illustrated in FIG. 1, four or more devices 20 may be included, or only two or less devices 20 may be included.

For example, the device 20 is an audio device or an audio/visual (AV) device. Specifically, the device 20 is an AV receiver, an AV amplifier, a speaker, an optical disc player (Blu-ray disc (trademark) player, a DVD (trademark) player, or the like), or a television receiver. Moreover, for example, the device 20 may be a musical instrument (an electronic musical instrument, an electric musical instrument, or the like). The device 20 may be a device other than those devices.

In the following, an example in which the first device 20-1 is an AV receiver, the second device 20-2 is a television receiver, and the third device 20-3 is a Blu-ray disc player is assumed.

The second device 20-2 is connected to a first high-definition multimedia interface (HDMI) (trademark) terminal (HDMI 1) of the first device 20-1 through an HDMI cable. The third device 20-3 is connected to a second HDMI terminal (HDMI 2) of the first device 20-1 through an HDMI cable. Moreover, private IP addresses "192.168.0.2", "192.168.0.3", and "192.168.0.4" are set to the first device 20-1, the second device 20-2, and the third device 20-3, respectively.

As illustrated in FIG. 1, the first device 20-1 includes a controller 21, a storage 22, and a communication unit 23. The controller 21 includes at least one microprocessor (CPU), and is configured to carry out processing in accordance with programs stored in the storage 22. The storage 22 includes a main storage (e.g., RAM) and an auxiliary storage (e.g., a nonvolatile semiconductor memory or a hard disk drive). The storage 22 is configured to store programs and data. The communication unit 23 is configured to transmit/receive data to/from other devices. The second device 20-2 and the third device 20-3 also include the controller 21, the storage 22, and the communication unit 23, which are not shown in FIG. 1.

The device 20 may include a component (e.g., an optical disc drive or a memory card slot) configured to read programs and data stored in an information storage medium (e.g., an optical disc or a memory card). Further, the programs may be supplied to the devices 20 through the information storage medium. The programs may be supplied to the devices 20 through the Internet 6.

The speech input device 30 includes a microphone and is configured to receive speech input. In at least one embodiment, the speech input device 30 is used by a user for the speech input of an operation instruction to the devices 20. For example, when the user wants to start up the device 20 installed in a living room from a standby state through the command processing system 50 supplied from a company X, the user inputs "AAA, ask MC to turn on the Living Room" or the like to the speech input device 30. In this case, "AAA" is a word (wake word) for starting the speech input to the speech input device 30, and is, for example, a name of the speech input device 30. "MC" is a name of the command processing system 50.

The speech data indicating the speech (phrase) input to the speech input device 30 is transmitted together with a user ID to the speech recognition device 40 through the Internet 6. The speech recognition device 40 is implemented by, for example, a server computer. The speech recognition device 40 may be implemented by a plurality of servers through so-called cloud computing. The speech recognition device 40 is configured to carry out speech recognition processing, to thereby convert the speech data to data in a form easily recognized by a program (command processing system 50). For example, the speech recognition device 40 generates an operation instruction in a predetermined form, which contains strings indicating a type of instruction by the user and a subject to the instruction, from the speech data on the phrase. Then, the operation instruction is transmitted together with the user ID to the command processing system 50. The user ID may be added by any device (processing) on the Internet side before the speech data is transmitted to the command processing system 50.

Under this state, the speech recognition device 40 is capable of transmitting the operation instruction to a command processing system 50 capable of processing content of the phrase transmitted from the user in accordance with the content of the phrase, for example, a specific word group in the phrase. The user registers the command processing systems 50 to be used in the speech recognition device 40 in advance. The speech recognition device 40 selects any one of the registered command processing systems 50 based on words contained in the phrase input from the user, and transmits the operation instruction to the selected command processing system 50. Moreover, the speech recognition device 40 may receive a plurality of types of phrases corresponding to a specific device 20, and control the device 20 through the command data transmission device 10 corresponding to each of the types of phrases. For example, a format of wording of the instruction in a phrase differs in accordance with the type of the phrase.

For example, in a first type of phrase, a phrase for starting up the device 20 having a name "Living Room" is "AAA, ask MC to turn on the Living Room". In a second type, a phrase for starting up the device 20 is "AAA, turn on the Living Room". While the phrase in the first type contains "MC", which is a name for identifying the command processing system 50, the phrase in the second type does not contain the name. Whether the speech recognition device 40 receives the first type of phrase to transmit an operation instruction, or receives the second type of phrase to transmit an operation instruction is set by the user. Detailed description is later made of this setting. The command processing system 50, which is the transmission destination when the speech recognition device 40 receives the first type of phrase, may be different from that of the second type.

A user terminal 60 is configured to receive a physical operation, for example, a touch operation by the user, to thereby control the device 20. Moreover, the user terminal 60 is configured to set the command processing system 50 and the speech recognition device 40 based on an operation by the user. The user terminal 60 is, for example, a smartphone or a personal computer. The user terminal 60 includes a controller 61, a storage 62, and a communication unit 63. The controller 61, the storage 62, and the communication unit 63 are the same as the controller 21, the storage 22, and the communication unit 23, respectively.

As illustrated in FIG. 1, the command processing system 50 includes the command data transmission device 10, a database 52, and a message queueing telemetry transport (MQTT) server 53.

The database 52 stores various types of data. For example, the database 52 stores information on devices 20 owned by respective users. FIG. 2 is a diagram for illustrating an example of device tables stored in the database 52. A device table T1 is stored for each of the users (while associated with the user ID). The user ID used in the command processing system 50 (database 52), the user terminal 60, and the devices 20 may be different from or the same as the user ID used in the speech input device 30 and the speech recognition device 40. When those user IDs are different from each other, correspondence data for converting those user IDs to each other is stored in the command processing system 50 or the speech recognition device 40.

As shown in FIG. 2, the device table T1 includes fields of "ID", "name", "device ID", "IP address", "command type", "terminals", "connection destination", "reception availability", and "acceptable commands".

The "ID" field indicates information for uniquely identifying each device 20 owned by the user. In FIG. 2, the first device 20-1 corresponds to a device ID of "1", and the second device 20-2 corresponds to a device ID of "2".

The "name" field indicates a name of the device 20. This name is used by the user to specify the device 20 subject to the operation instruction. As the name, any name set by the user may be used, or, for example, an initial name set by a manufacturer of the device 20 or the like may be used, and may be modifiable by the user.

The "device ID" field indicates a device ID for solely and uniquely identifying the device 20. The device ID may be a MAC address of the device 20, or an ID generated based on the MAC address. The "IP address" field indicates an IP address set to a wireless or wired network interface card provided for the device 20. The "command type" field is a type (system) of commands used in the device 20. The "terminals" field indicates a list of input terminals provided for the device 20. The "connection destination" field indicates an input terminal of another device 20 to which the device 20 is connected when the device 20 is connected to the another device 20 and the sound output from the device 20 is input to the another device 20.

The "reception availability" field indicates whether a message containing a command can be received through the Internet 6. Detailed description is later made of the message. For example, "0" or "1" is registered in the "reception availability" field. "0" indicates that a message cannot be received through the Internet 6. "1" indicates that a message can be received through the Internet 6.

The "acceptable commands" field indicates a list of commands that the device 20 can accept. When "Power" is set in the list of the "acceptable commands" field, the field indicates that the device can be started up from the standby state through an external command. Otherwise, the field indicates that the device cannot be started up from the standby state. Moreover, when "Volume" is set in the list of the "acceptable commands" field, the field indicates that a volume of the device can be controlled through an external command. Otherwise, the field indicates that the volume cannot be controlled through an external command.

The data in the device table T1 is registered by each user. The user can register information on the device 20 owned by the user with the device table T1 through access from the user terminal 60 to the command data transmission device 10. Detailed description is later made of the registration.

Data other than the device tables T1 is stored in the database 52. For example, a user and data indicating types of phrases that can be input by the user for the device 20 associated with each other are stored in the database 52. Additionally, data indicating a correspondence between an operation instruction and a command (namely, data for converting the operation instruction to the command) may be stored in the database 52.

The command data transmission device 10 is implemented by, for example, a server computer. As illustrated in FIG. 1, the command data transmission device 10 includes a controller 11, a storage 12, and a communication unit 13. The controller 11, the storage 12, and the communication unit 13 are the same as the controller 21, the storage 22, and the communication unit 23, respectively. The command data transmission device 10 may include a component (e.g., an optical disc drive or a memory card slot) configured to read programs and data stored in an information storage medium (e.g., an optical disc or a memory card). Further, the programs may be supplied to the command data transmission device 10 through the information storage medium. The programs may be supplied to the command data transmission device 10 through the Internet 6.

The command data transmission device 10 can make access to the database 52. The command data transmission device 10 and the database 52 may be implemented by a single server computer, or may be implemented by individual server computers.

The command data transmission device 10 is configured to receive an operation instruction, which is transmitted from the speech recognition device 40 and is directed to the device 20, generate a message containing a command based on the operation instruction, and transmit the message to the device 20. More specifically, the message is transmitted to the device 20 through the MQTT server 53. The MQTT server 53 is configured to transmit/receive data through use of the MQTT protocol. The command data transmission device 10 and the MQTT server 53 may be implemented by a single server computer, or may be implemented by individual server computers.

[2. Functional Blocks] FIG. 3 is a block diagram for illustrating functions implemented by the command data transmission device 10, the devices 20, and the user terminal 60.

Figure 3:
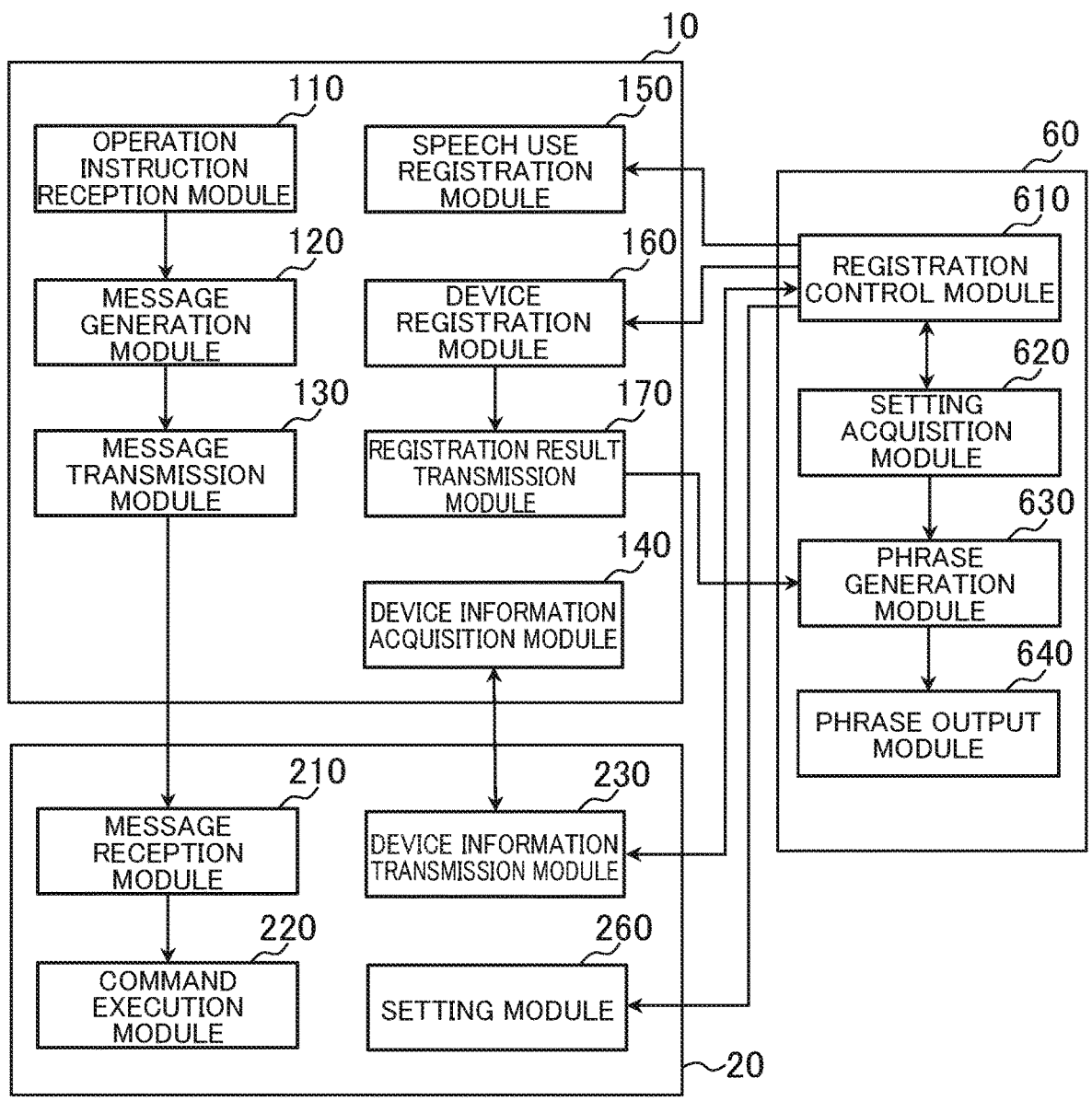
FIG. 3 is a block diagram for illustrating functions implemented by a speech recognition device, a command data transmission device, a device, and a user terminal.

As illustrated in FIG. 3, the command data transmission device 10 includes an operation instruction reception module 110, a message generation module 120, a message transmission module 130, a device information acquisition module 140, a speech use registration module 150, a device registration module 160, and a registration result transmission module 170. The operation instruction reception module 110, the message generation module 120, the message transmission module 130, the device information acquisition module 140, the speech use registration module 150, the device registration module 160, and the registration result transmission module 170 are implemented by the controller 11 executing programs for the respective functions stored in the storage 12.

Moreover, as illustrated in FIG. 3, the device 20 includes a message reception module 210, a command execution module 220, a device information transmission module 230, and a setting module 260. The message reception module 210, the command execution module 220, the device information transmission module 230, and the setting module 260 are implemented by the controller 21 executing programs for the respective functions stored in the storage 22.

Moreover, as illustrated in FIG. 3, the user terminal 60 includes a registration control module 610, a setting acquisition module 620, a phrase generation module 630, and a phrase output module 640. The registration control module 610, the setting acquisition module 620, the phrase generation module 630, and the phrase output module 640 are implemented by the controller 61 executing programs for the respective functions stored in the storage 62.

[2-1] First, description is made of the operation instruction reception module 110, the message generation module 120, the message transmission module 130, the message reception module 210, and the command execution module 220.

The operation instruction reception module 110 is configured to receive an operation instruction directed to the device 20. For example, the operation instruction reception module 110 receives an operation instruction from the speech recognition device 40. The operation instruction is converted by the speech recognition device 40 to data in a form, for example, text data, which is recognizable by a program.

When the operation reception module 110 receives the operation instruction directed to the device 20, the message generation module 120 generates a message containing a user ID and a command. The user ID is used to identify the user relating to the operation instruction. The command is data, for example, text, for causing an operation to be carried out in accordance with the operation instruction.

FIG. 4 is a diagram for illustrating an example of a message D1. The message D1 illustrated in FIG. 4 is an example of a message generated when an operation instruction to start up the first device 20-1 from the standby state is received.

The message D1 contains items of "uid", "type", "id", and "command". The item of "uid" is a user ID of a user who issues the operation instruction. In the example illustrated in FIG. 4, a user ID of "U1" is set to the item of "uid". The item of "type" indicates a type of the data. In the example illustrated in FIG. 4, "cmd" is set to the item of "type". This indicates that a command is contained in the message. The item of "id" indicates identification information for uniquely identifying the message. Data set to the item of "command" indicates content of the command. The item of "command" contains items of "ip", "path", and "method". The item of "ip" indicates a destination of the command. In the example of FIG. 4, the IP address of the first device 20-1 is set to the item of "ip". The item of "path" corresponds to a command itself. The item of "method" indicates a method of the HTTP protocol to be used.

The message transmission module 130 is configured to transmit the message generated by the message generation module 120 to the device 20. When the device 20 subject to the operation instruction cannot receive the message through the Internal 6 ("0" is set to the "reception availability" field), the message transmission module 130 may transmit the message to another device 20, and then cause the another device 20 to transfer the message to the subject device 20.

The message is transmitted to the device 20 through the MQTT protocol. In other words, the message transmission module 130 transmits the message to the device 20 through the MQTT server 53. A plurality of topics exist in the MQTT server 53. Identification information on each of the topics is set based on the device IDs of the devices 20. At the time of the transmission from the command data transmission device 10 to the devices 20, the command data transmission device 10 publishes the message to a topic on a request side, which contains identification information corresponding to the device IDs, and the devices 20 receive the message published to the topic on the request side, which contains the identification information on the devices 20. The communication between the command processing system 50 and the devices 20 may be carried out through a protocol different from the MQTT protocol.

The message reception module 210 receives the message through the Internet 6. The command execution module 220 executes the command based on the command contained in the message. The execution module 220 may directly interpret the command contained in the message, to thereby directly control the device 20. Moreover, the command execution module 220 may include an internal execution module configured to execute a command received from the user terminal 60 or the like existing in the local area through the LAN 2, and a conversion module configured to convert a command contained in a received message and internally transmit the converted command to the internal execution module. For example, the device 20 may activate the HTTP daemon, and the internal execution module may receive the command from the conversion module through the HTTP protocol.

[2-2] Description is now made of an overview of the registration control module 610, the setting acquisition module 620, the phrase generation module 630, the phrase output module 640, the speech use registration module 150, the device registration module 160, the registration result transmission module 170, and the setting module 260.

The registration control module 610 is configured to enable the speech recognition device 40 to receive a phrase of at least one of the first type and the second type and is configured to enable to transmit the operation instruction to the command processing system 50. More specifically, the registration control module 610 causes the speech recognition device 40 and the command processing system 50 to carry out processing of the use registration for this user. Moreover, the registration control module 610 registers the devices 20 subject to the instruction through the speech input to the command processing system 50, based on an operation by the user.

The setting acquisition module 620 is configured to detect the devices 20 connected to the local area, and acquire, from the detected devices 20, device information containing the names of the devices 20 used in the speech input for the devices 20. Moreover, the setting acquisition module 620 acquires, from the registration control module 610 or the command processing system 50, information indicating the types of phrases that the speech recognition device 40 can accept. The device information and the information indicating the types of phrases are hereinafter generally referred to as "user setting". This is because the name of the device 20 used in the speech input and the available types of phrases are items that can be set by the user. When a plurality of devices 20 are detected by the setting acquisition module 620, for example, the registration control module 610 registers one or a plurality of devices 20 specified by the user out of the detected devices 20 as devices 20 subject to the instruction through the speech input.

The speech use registration module 150 receives, from the registration control module 610 of the user terminal 60, a request (use registration request) to register the use of the command processing system 50 through the speech input by the user, and carries out processing of enabling the speech input by the user through cooperation of the command data transmission device 10 and the speech recognition device 40.

The device registration module 160 is configured to receive, from the registration control module 610 of the user terminal 60, a request (device registration request) to register a device 20 subject to the instruction through the speech input, to thereby register the device 20 as the subject to the speech input. The registration result transmission module 170 is configured to transmit a result (device registration result) of the registration of the device 20 and a template of sample phrases.

The setting module 260 is configured to receive a user ID registration instruction from the registration control module 610 of the user terminal 60, and write a user ID contained in the user ID registration instruction in the nonvolatile memory. Moreover, the setting module 260 is configured to receive a connection start instruction from the registration control module 610 of the user terminal 60, and connect to the MQTT server 53 included in the command processing system 50, to thereby enable reception from the command processing system 50.

The phrase generation module 630 is configured to generate a phrase capable of controlling a device 20 based on the user setting acquired by the setting acquisition module 620. The phrase output module 640 is configured to output data for displaying the generated phrase. As a result of the output of the data by the phrase output module 640, the generated phrase is displayed on a device visually recognizable by the user, for example, a display screen of the user terminal 60.

[2-3] Description is now made of the device information acquisition module 140 and the device information transmission module 230.

The device information acquisition module 140 is configured to acquire the device information on the device 20. The device information acquisition module 140 is configured to generate a message (hereinafter referred to as "device information request"), and transmit the message to the device 20 through the Internet 6. The device information request contains a command for causing a device 20 to transmit device information on the device 20 to the device information acquisition module 140 and a user ID. More specifically, the device information acquisition module 140 transmits the device information request to the device 20 through the MQTT server 53. The generation and the transmission of the device information request may also be carried out by the message generation module 120 and the message transmission module 130.

When the device information request is received, the device information transmission module 230 returns the device information on the device 20 to the command data transmission device 10 through the Internet 6. The device information contains, for example, device type information on the device 20, the name used by a user to identify the device 20, the device ID, and the IP address. Moreover, the device information may contain current information indicating a current state of the device 20. The device information transmission module 230 transmits the device information to the command data transmission device through the MQTT server 53. The device information acquisition module 140 receives the device information. Then, the device information acquisition module 140 extracts required items out of the received device information, and registers those items in the device table T1.

[3. Processing] Description is now made of processing to be carried out by the device control system 1.

[3-1] First, description is made of processing of the use registration for the speech input. The processing of the use registration for the speech input contains processing of enabling the speech recognition device 40 to receive one or a plurality of types of phrase for a user and transmitting an operation instruction, and processing of registering information enabling the command processing system 50 to receive the operation instruction. This processing is required to be carried out before the user uses the command processing system 50 through the speech input.

Figure 5:
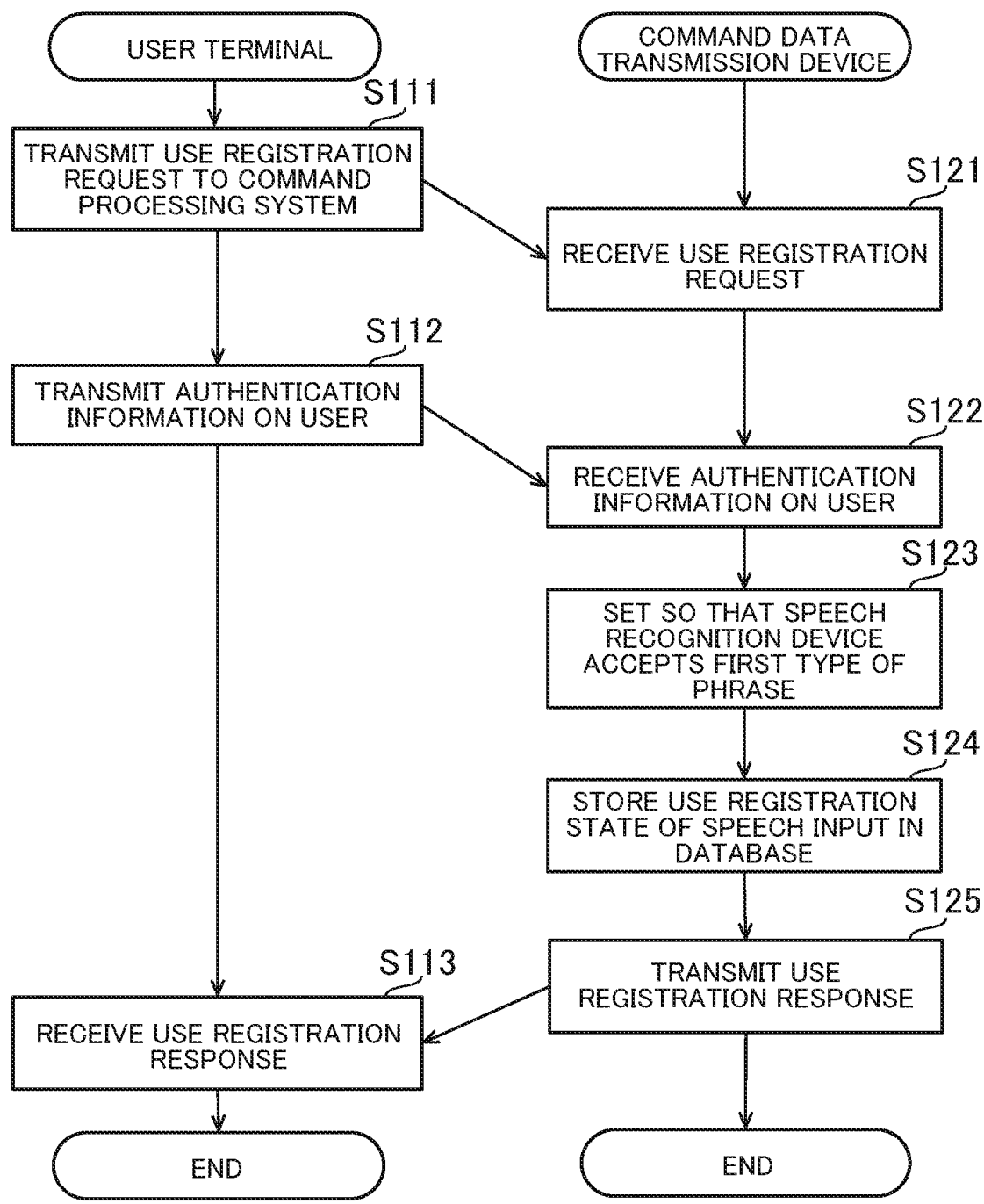
FIG. 5 is a flowchart for illustrating an example of processing of use registration for speech input.

Description is now made of an example of processing for the use registration for the first type of phrases. The second type of phrases may be registered through the same processing as that described below. FIG. 5 is a flowchart for illustrating an example of the processing of the use registration for the speech input. The processing described below to be carried out by the speech use registration module 150 is carried out by the controller 11 executing a program corresponding to its function. The processing to be carried out by the registration control module 610 is carried out by the controller 61 executing a program corresponding to its function.

First, when a user issues an instruction to start processing for the use registration, the registration control module 610 of the user terminal 60 transmits the use registration request to the command processing system 50 (Step S111). Moreover, the speech use registration module 150 of the command data transmission device 10 receives the use registration request through the communication unit 13 (Step S121). The use registration request contains information indicating a speech recognition device 40 for receiving the speech input and a command processing system 50 for processing an operation instruction, which are directly or indirectly specified by the user. Moreover, the registration control module 610 transmits authentication information on the user (Step S112). The speech use registration module 150 receives the authentication information on the user through the communication unit 13 (Step S122). The authentication information transmitted from the user terminal 60 maybe, for example, the user ID and a password. Moreover, when an authentication server other than the command processing system 50 exists, the registration control module 610 may transmit, as the authentication information, access permission information (type of token) acquired from the authentications server by inputting identification information on the user input by the user and the password to the authentication server. In this case, the registration control module 610 may use the access permission information to acquire the user ID from the authentication server. The user ID input in this case and the user ID used by the command processing system 50 and the device 20 may be different from each other. For example, the speech use registration module 150 may generate a hash value of the user ID contained in the authentication information as the user ID to be used in the subsequent processing.

When the authentication information is acquired, the speech use registration module 150 carries out such setting that the speech recognition device 40 receives speech input of the first type of phrase from the user, and such setting that the speech recognition device 40 transmits an operation instruction for the first type of phrase to the command processing system 50 (Step S123).

Then, the speech use registration module 150 stores a use registration state of the speech input in a database (Step S124). FIG. 6 is a table for showing an example of a speech input use table. The speech input use table contains fields of "user ID", "registration for first type", and "registration for second type". The "user ID" serves as a key for uniquely identifying a record in the table. The "registration for first type" indicates whether the processing for the use registration for receiving the first type of phrase has been carried out for the user indicated by the "user ID" field. The "registration for second type" field indicates whether the processing for the use registration for receiving the second type of phrase has been carried out for the user indicated by the "user ID" field.

After the use registration state for the speech input is stored in the database, the speech use registration module 150 transmits a response indicating whether the use registration for the speech input is successful (Step S125). The registration control module 610 receives the use registration response (Step S113).

Figure 7:
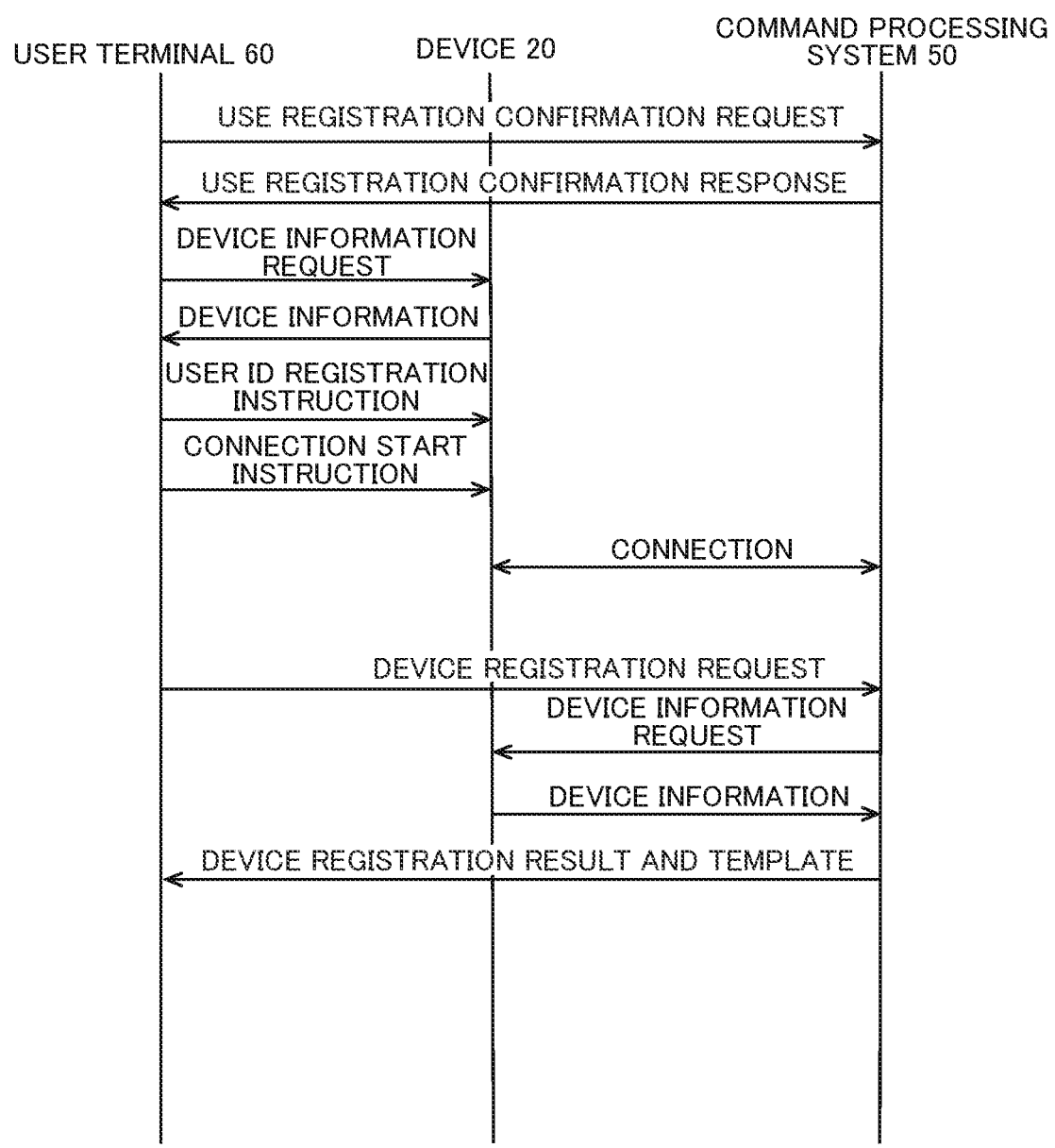
FIG. 7 is a sequence diagram for illustrating processing of device registration.
Figure 8:
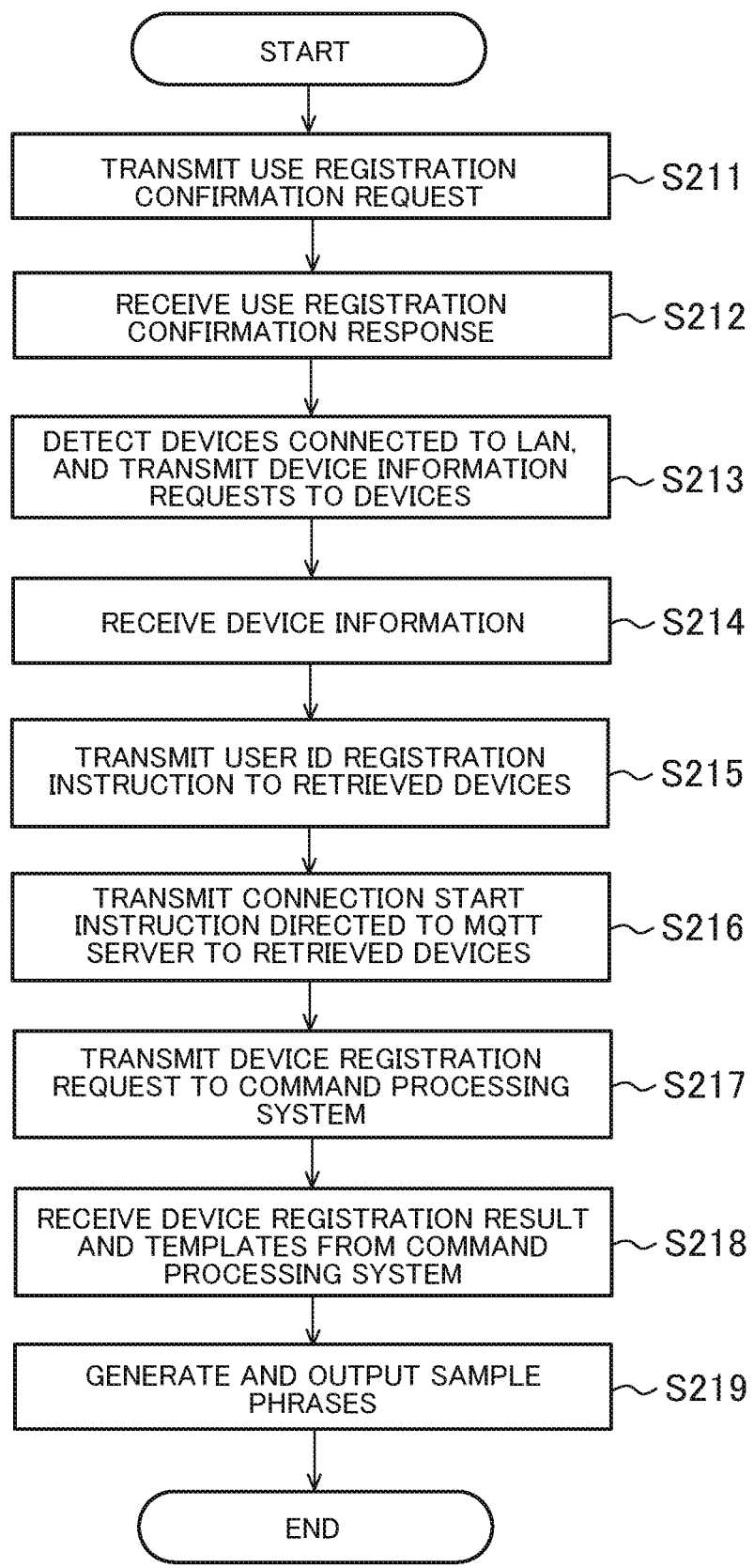
FIG. 8 is a flowchart for illustrating an example of processing by the user terminal in the device registration.

[3-2] Description is now made of the processing (registration processing) of registering the devices 20 subject to the instruction through the speech input in the command processing system 50 based on the operation by the user. FIG. 7 is a sequence diagram for illustrating the processing of the device registration. FIG. 8 is a flowchart for illustrating an example of processing by the user terminal 60 in the device registration. FIG. 9 is a flowchart for illustrating an example of processing by the device 20 in the device registration. FIG. 10 is a flowchart for illustrating an example of processing by the command data transmission device 10 in the device registration.

Processing to be carried out by the device registration module 160, the registration result transmission module 170, and the device information acquisition module 140 is carried out by the control module 11 executing programs corresponding to their functions. Processing to be carried out by the registration control module 610, the setting acquisition module 620, the phrase generation module 630, and the phrase output module 640 is carried out by the control module 61 executing programs corresponding to their functions. Processing to be carried out by the device information transmission module 230 and the setting module 260 is carried out by the control module 21 executing programs corresponding to their functions.

In the following, description is made of the registration processing to be carried out by the user terminal 60, the command data transmission device 10, and the device 20 in an order of the sequence diagram of FIG. 7.

First, when the registration control module 610 of the user terminal 60 acquires an instruction to start the device registration from the user, the registration control module 610 transmits a use registration confirmation request to the command processing system 50 through the communication unit 63 (Step S211). More specifically, the use registration confirmation request is a information for inquiring whether one or a plurality of types of phrases are registered to use in the speech recognition device 40. Then, the device registration module 160 of the command data transmission device 10 receives the use registration confirmation request, and transmits a use registration confirmation response indicating the state of the use registration of the speech recognition (Step S251). More specifically, the device registration module 160 acquires a record stored in the speech input use table for the user who has instructed to start the device registration, and returns information indicating the types of phrases registered for use based on the values of the fields of the registration for the first type and the registration for the second type. The use registration confirmation response may include information indicating the user ID of the user who operates the user terminal 60. The registration control module 610 of the user terminal 60 receives the use registration confirmation response, and stores the information indicating the types of phrases registered for use and the like in the storage 62 (Step S212). When the use registration is not executed for any type of phrases to operate the device 20 for the user, an error message is transmitted as the use registration confirmation response, and the registration control module 610 outputs a screen for enabling the user to carry out the use registration.

When the setting acquisition module 620 receives the use registration confirmation response, the setting acquisition module 620 detects one or a plurality of devices 20 connected to the local area (LAN 2), and transmits device information requests to the detected one or plurality of devices 20 (Step S213). The device information transmission module 230 of the device 20 receives the device information request, and transmits the device information to the user terminal 60 (Step S221). The device information contains the name of the device set by the user and the device ID. The setting acquisition module 620 of the user terminal 60 receives the transmitted device information (Step S214).

When the device information is received, the registration control module 610 transmits user ID registration instructions to the retrieved devices 20 (Step S215). The setting module 260 of the device 20 receives the user ID registration instruction (Step S222). The user ID registration instruction contains the user ID to be registered in the device 20. Moreover, when the user ID registration instruction is received, the setting module 260 writes the user ID in the nonvolatile memory (Step S223).

When the user ID is written, the registration control module 610 of the user terminal 60 transmits, to the retrieved devices, connection start instructions to connect to the MQTT server (Step S216). The setting module 260 of the device 20 receives the connection start instruction to connect to the MQTT server 53 (Step S224). Then, the setting module 260 connects to the MQTT server 53 (Step S225) so as to bring about a state in which an operation instruction can be received from the MQTT server 53.

When the devices 20 connect to the MQTT server 53, the registration control module 610 of the user terminal 60 transmits a device registration request to the command processing system 50 (command data transmission device 10) (Step S217). The device registration request contains the user ID and the device ID of the device 20 to be registered. The command data transmission device 10 receives the device registration request from the user terminal 60 (Step S252). The access permission information on the permission for the access to the authentication server may be contained in the device registration request in place of the user ID. In this case, the command data transmission device 10 may use the access permission information to acquire the user ID or information that is a source of the user ID from the authentication server.

Then, the device registration module 160 transmits a device information request to the device 20 having the device ID contained in the device registration request (Step S253). The device information transmission module 230 receives the device information request from the command processing system 50 (MQTT server 53), and transmits the device information to the command processing system 50 (Step S226). The device registration module 160 receives the device information (Step S254). The device information contains information indicating a system of a command set, information on the input terminals of the device 20, information on other devices 20 connected to the input terminals, information on whether the device can receive messages through the Internet 6, and a list of commands that the device 20 can accept. The device registration module 160 stores at least a part (containing the device ID) of the received device information associated with the user ID in the device table T1 (Step S255). The device registration module 160 may sort out and shape the information contained in the device information, and store the resulting information in the device table T1.

When the device registration module 160 has finished the processing up to Step S255, the registration result transmission module 170 selects templates of sample phrases based on the use registration state of the speech input, namely, the types of phrases that the speech recognition device 40 can receive for the user (Step S256). Moreover, the device registration module 160 transmits, to the user terminal 60, a device registration result indicating whether each of the devices has been successfully registered and the selected templates of the sample phrases (Step S257).

FIG. 11 is a diagram for illustrating an example of the templates of the sample phrases. The sample phrase is a phrase capable of controlling the device 20 when the phrase is input by the user through the speech. FIG. 11 is an illustration of an example of a case in which phrases of the first type and the second type are registered for use. A first template TP1 contains a template of sample phrases of the first type. A second template TP2 contains a template of sample phrases of the second type. Content of the sample is a character string set to an item of "sentence". The name of the device can be set by the user, and cannot thus be prepared in advance. Therefore, a temporary character string of "% s" is embedded in the content of the sample. A character string set to an item of "feature" indicates a command that the device 20 subject to the operation is required to have.

The phrase generation module 630 receives the result of the processing for the device registration request and the templates of the sample phrases from the command processing system 50 (command data transmission device 10) (Step S218). The phrase generation module 630 generates sample phrases based on the received templates, and the use registration state and the names of the devices, which are set by the user, and the phrase output module 640 outputs the generated sample phrases (Step S219).

Figure 12:
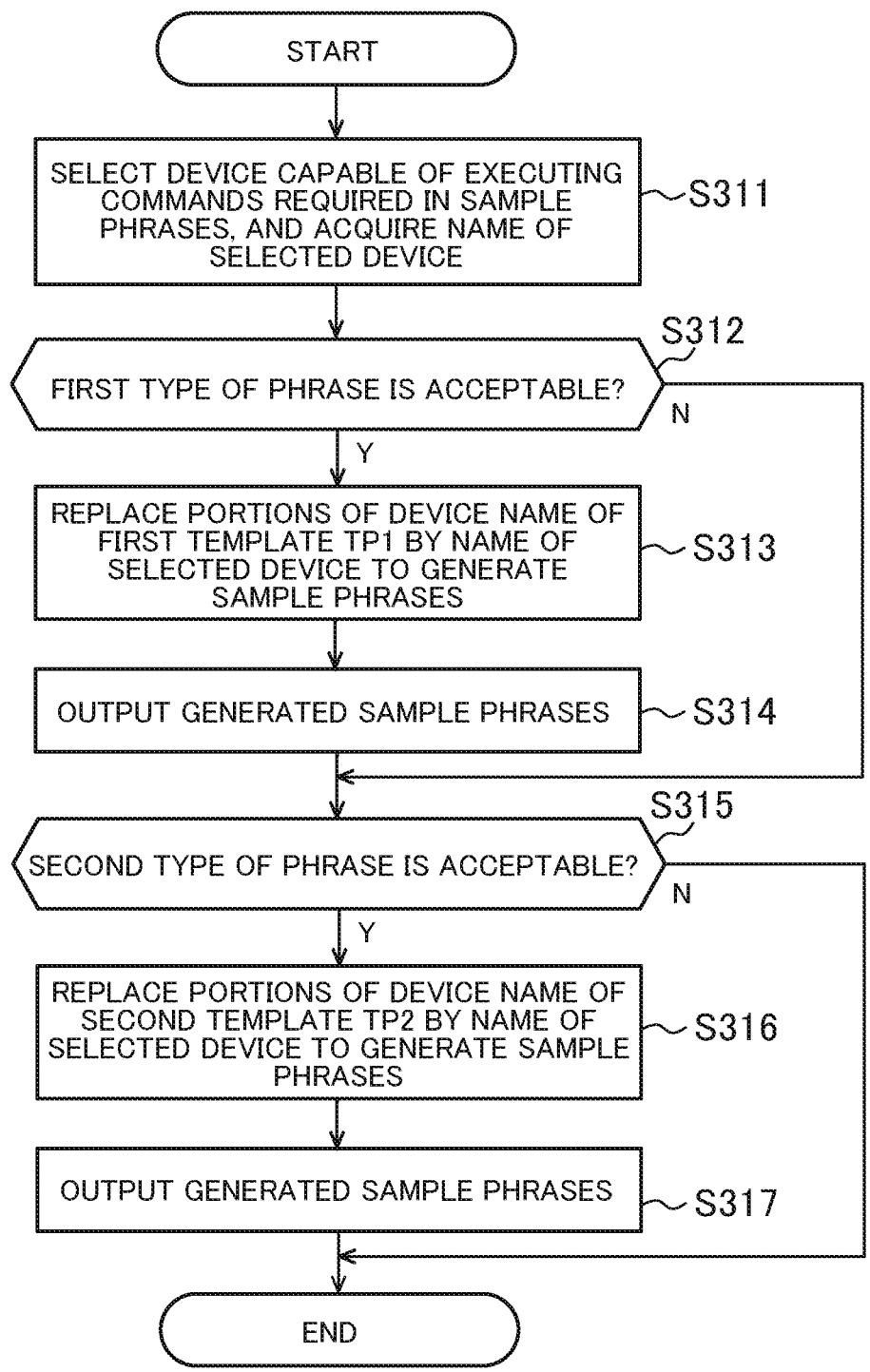
FIG. 12 is a flowchart for illustrating an example of processing by a phrase generation module and a phrase output module.

More detailed description is now made of the processing by the phrase generation module 630 and the phrase output module 640. FIG. 12 is a flowchart for illustrating an example of the processing by the phrase generation module 630 and the phrase output module 640.

First, the phrase generation module 630 selects a device 20 capable of executing commands required by sample phrases, and acquires the name of the selected device 20 (Step S311). The phrase generation module 630 collects, for example, commands set to the item of "feature" of the template, selects a record having all the collected commands in the field of the acceptable commands out of records of the certain user stored in the device table T1, and acquires the name of a device contained in the record.

Then, the phrase generation module 630 carries out processing in accordance with the user setting (information indicating the types of phrases registered for use and the name of the device). More specifically, the following processing is carried out. First, the phrase generation module 630 determines whether the information indicating the types of phrases registered for use indicates a state in which the first type of phrases can be accepted (Step S312). When the information indicates the state in which the first type of phrase can be accepted (Y in Step S312), the phrase generation module 630 replaces the portion of the device name out of the wording of the first template TP1 by the name of the selected device, to thereby generate sample phrases (Step S313). Then, the phrase output module 640 outputs data on the generated sample phrases so that the sample phrases are displayed on the screen of the user terminal 60 (Step S314). In this case, when the information indicating the types of phrases registered for use does not indicate the state in which the first type of phrase can be accepted (N in Step S312), the processing in Step S313 and Step S314 is skipped.

FIG. 13 is a diagram for illustrating an example of the displayed sample phrases. The example of FIG. 13 is an example of a screen displayed based on the first template TP1 when the first type of phrase is set to be acceptable. A device 20 having the name of "Living Room" can process a command for a volume operation, and corresponding phrases are thus output as the sample phrases.

Then, the phrase generation module 630 determines whether the information indicating the types of phrases registered for use indicates that the second type of phrase can be accepted (Step S315). When the information indicates the state in which the second type of phrase can be accepted (Y in Step S315), the phrase generation module 630 replaces the portion of the device name out of the wording of the second template TP2 by the name of the selected device, to thereby generate sample phrases (Step S316). Then, the phrase output module 640 outputs data on the generated sample phrases so that the sample phrases are displayed on the screen of the user terminal 60 (Step S317). In this case, when the information indicating the types of phrases registered for use does not indicate the state in which the second type of phrase can be accepted (N in Step S315), the processing in Step S316 and Step S317 is skipped.

FIG. 14 is a diagram for illustrating another example of the displayed sample phrases. The example of FIG. 14 is an example of a screen displayed based on the second template TP2 when the second type of phrase is set to be acceptable.

In such a manner, the user can easily and reliably acquire the sample phrases acceptable in the speech input through dynamic control of the sample phrases displayed as the input example of the command. Moreover, even when the acceptable phrases change in accordance with the user, the user is not required to replace the content of the sample phrase by also using the user setting to generate sample phrases. The user can thus easily recognize acceptable and valid sample phrases.

Figure 15:
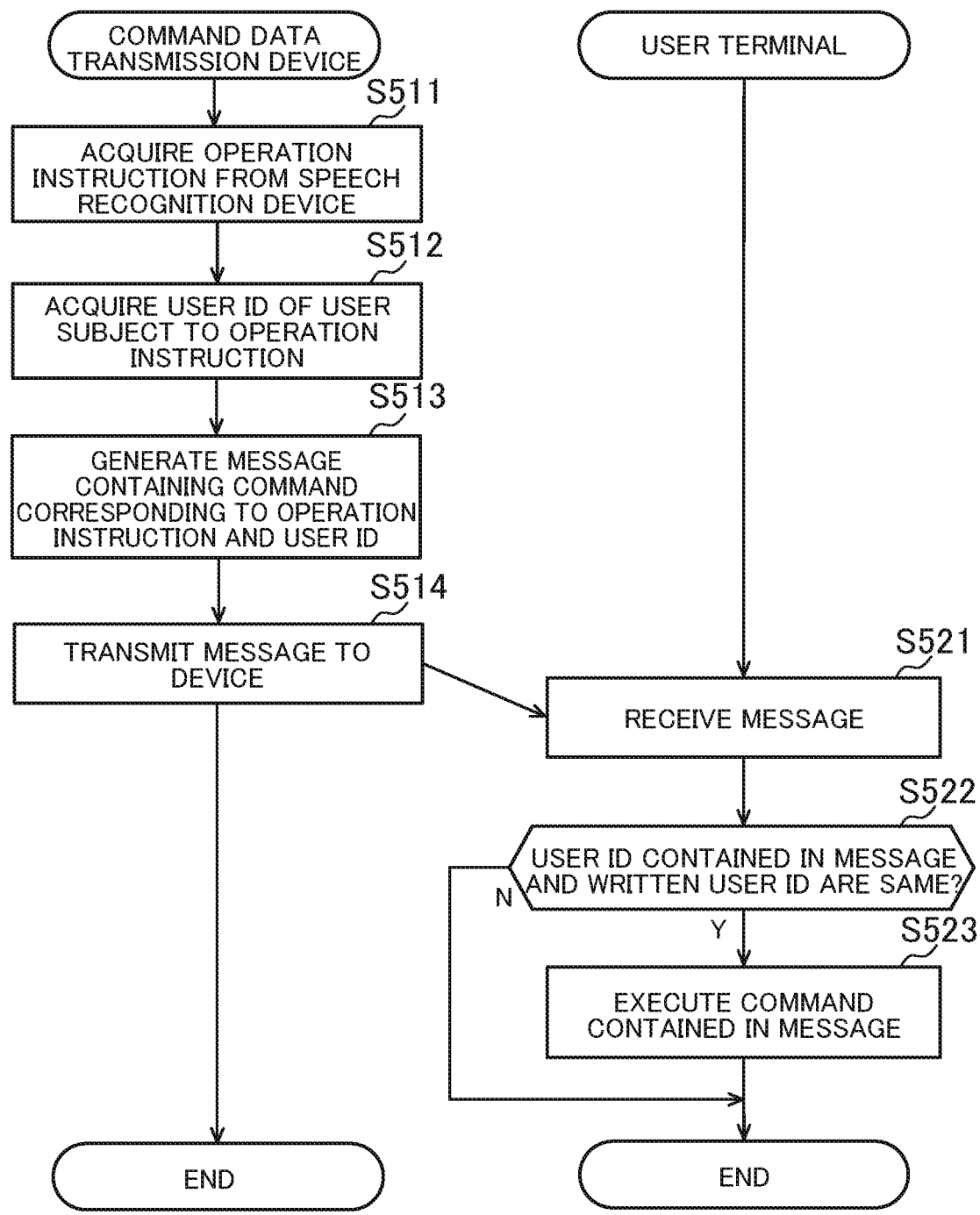
FIG. 15 is a flowchart for illustrating an example of processing by an operation instruction reception module, a message generation module, a message transmission module, a message reception module, and a command execution module.

[3-3] Description is now made of processing by the command processing system 50 of receiving an operation instruction and controlling the device 20. FIG. 15 is a flowchart for illustrating an example of processing by the operation instruction reception module 110, the message generation module 120, the message transmission module 130, the message reception module 210, and the command execution module 220. The processing described below to be carried out by the operation instruction reception module 110, the message generation module 120, and the message transmission module 130 is carried out by the controller 11 executing programs corresponding to their functions. The processing to be carried out by the message reception module 210 and the command execution module 220 is carried out by the controller 21 executing programs corresponding to their functions.

First, the operation instruction reception module 110 acquires an operation instruction from the speech recognition device 40 (Step S511). Then, the message generation module 120 acquires the user ID of a user subject to the operation instruction based on the acquired operation instruction, and acquires the device ID of a device 20 that is associated with the user ID and is subject to the operation instruction, based on the name of the device contained in the operation instruction and the device table T1 (Step S512). Then, the message generation module 120 generates a message containing a command corresponding to the operation instruction and the acquired user ID (Step S513). The message transmission module 130 transmits the generated message to the device 20 subject to the operation instruction (Step S514).

The message reception module 210 of the device 20 subject to the operation instruction receives the message (Step S521). Then, the message reception module 210 compares the user ID contained in the message and the user ID written in the nonvolatile memory of the device 20 with each other (Step S522). When those user IDs are the same (Y in Step S522), the command execution module 220 executes the command contained in the message (Step S523). On the other hand, when those user IDs are different from each other (N in Step S522), the message is discarded, and the command contained in the message is not executed.

As described above, the message reception module 210 controls whether the command is to be executed in accordance with the comparison result of the user IDs. As a result, an unexpected operation of the device 20 can be prevented. In particular, in a related-art case, in a case where the device 20 is transferred to other user, but the device registration is not reset on the command processing system 50 side, when a user who has transferred the device 20 inputs a command directed to the device 20 through speech by mistake, the device 20 may function by mistake through the command. In contrast, in at least one embodiment, when the user to whom the device is transferred has registered the device, irrespective of a command input by the user who has transferred the device, a message containing the command is discarded on the device 20 side, and the possibility of an unexpected operation can thus be suppressed.

Supplementary Notes

As can be understood from the above description of at least one embodiment, in the present application, a variety of technical ideas including embodiments of the invention described below are disclosed.

A device control system according to at least one embodiment of the present invention includes: setting acquisition means for acquiring user setting relating to a device; phrase generation means for generating a phrase for controlling the device based on the acquired user setting; and display data output means for outputting data for displaying the generated phrase.

A device control method according to at least one embodiment of the present invention includes: acquiring user setting relating to a device; generating a phrase for controlling the device based on the acquired user setting; and outputting data for displaying the generated phrase.

A program according to at least one embodiment of the present invention causes a computer to function as: setting acquisition means for acquiring user setting relating to a device; phrase generation means for generating a phrase for controlling the device based on the acquired user setting; and display data output means for outputting data for displaying the generated phrase.

According to one aspect of the invention described above, the setting acquisition means may be configured to acquire a name for identifying the device in speech input, and the phrase generation means may be configured to generate a phrase for controlling the device based on the acquired name.

According to one aspect of the invention described above, the setting acquisition means may be configured to acquire a command executable by each of a plurality of devices in the speech input, and the phrase generation means may be configured to generate a phrase containing any one of names of the plurality of devices based on the command executable by each of the plurality of devices.

According to one aspect of the invention described above, the setting acquisition means may be configured to acquire information indicating a type of phrase acceptable by a recognition module, which is configured to recognize an instruction speech of a user, as an instruction directed to the device, and the phrase generation means may be configured to generate a phrase for controlling the device based on the acquired information.

According to one aspect of the invention described above, the recognition module is set by the user so that any one of a first type of phrase and a second type of phrase acceptable, the first type of phrase containing an identification name for identifying a system configured to acquire an operation instruction generated by the recognition module to control the device, the second type of phrase being inhibited from containing the identification name, and the phrase generation means may be configured to generate a phrase for controlling the device based on whether each of the first type of phrase and the second type of phrase is acceptable.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A device control system comprising:
    a plurality of devices to be controlled;
    a storage device storing a table that includes setting information on each of the plurality of devices, the setting information including a user setting of each of the plurality of devices in a speech input, the user setting of each device identifying a name thereof;
    at least one memory storing instructions; and
    at least one processor that implements the instructions to:
        acquire a template including a phrase containing a predetermined command term;
        obtain a predetermined command from the predetermined command term included in the template;
        obtain the setting information from the table;
        select, from among the plurality of devices, a first device that is configured to execute the obtained predetermined command based on the obtained setting information;
        acquire the identified name of the first device from the user setting thereof;
        generate a phrase for controlling the first device from the phrase included in the template by adding the identified name obtained from the user setting of the first device; and
        output data for displaying the generated phrase.

2. The device control system according to claim 1, wherein the user setting of each of the plurality of devices further includes a command to be controlled in the speech input and executable by the respective device thereof.

3. The device control system according to claim 1, wherein:
    the user setting further includes phrase information indicating a type of phrase acceptable by a recognition device, which is configured to recognize an instruction speech of a user, as an instruction directed to the first device, and
    the generated phrase is for controlling the first device based on the acquired user setting including the phrase information.

4. The device control system according to claim 3, wherein:
    the recognition device is settable by the user so that any one of a first type of phrase or a second type of phrase is acceptable, the first type of phrase containing an identification name for identifying a system configured to acquire an operation instruction generated by the recognition device to control the first device, and the second type of phrase being inhibited from containing the identification name, and the generated phrase is for controlling the first device based on whether each of the first type of phrase and the second type of phrase is acceptable.

5. A device control method of controlling a plurality of devices using at least one processor, the device control method comprising:
- storing, in a storage device, a table that includes setting information on each of the plurality of devices, the setting information including a user setting of each of the plurality of devices in a speech input, the user setting of each device identifying a name thereof;
- acquiring a template including a phrase containing a predetermined command term;
- obtaining a predetermined command from the predetermined command term included in the template;
- obtaining the setting information from the table;
- selecting, from among the plurality of devices, a first device that is configured to execute the obtained predetermined command based on the obtained setting information;
- acquiring the identified name of first device from the user setting thereof;
- generating, with the at least one processor, a phrase for controlling the first device from the phrase included in the template by adding the identified name obtained from the user setting of the first device; and
- outputting, with the at least one processor, data for displaying the generated phrase.

6. The device control method according to claim 5, wherein the user setting of each of the plurality of devices includes a command to be controlled in the speech input and executable by the respective device thereof.

7. The device control method according to claim 5, wherein:
- the user setting further includes phrase information indicating a type of phrase acceptable by a recognition device, which is configured to recognize an instruction speech of a user, as an instruction directed to the first device, and
- the generated phrase is for controlling the first device based on the acquired user setting including the phrase information.

8. The device control method according to claim 7, wherein:
- the recognition device is settable by the user so that any one of a first type of phrase or a second type of phrase is acceptable, the first type of phrase containing an identification name for identifying a system configured to acquire an operation instruction generated by the recognition device to control the device, and the second type of phrase being inhibited from containing the identification name, and
- the generated phrase is for controlling the first device based on whether each of the first type of phrase and the second type of phrase is acceptable.

9. A terminal device for controlling a plurality of devices in a device control system including a storage device storing a table that includes setting information on each of the plurality of devices, the setting information including a user setting of each of the plurality of devices in a speech input, the user setting of each device identifying a name thereof, the terminal device comprising:
- at least one memory storing instructions;
- at least one processor that implements the instructions to:
    - acquire a template including a phrase containing a predetermined command term;
    - obtain a predetermined command from the predetermined command term included in the template;
    - obtain the setting information from the table;
    - select, from among the plurality of devices, a first device that is configured to execute the obtained predetermined command based on the obtained setting information;
    - acquire the identified name of the first device from the user setting thereof;
    - generate a phrase for controlling the first device from the phrase included in the template by adding the identified name obtained from the user setting of the first device; and
    - output data for displaying the generated phrase.

10. The terminal device according to claim 9, wherein the user setting of each of the plurality of devices further includes a command to be controlled in the speech input and executable by the respective device thereof.

11. The terminal device according to claim 9, wherein:
- the user setting further includes phrase information indicating a type of phrase acceptable by a recognition device, which is configured to recognize an instruction speech of a user, as an instruction directed to the first device, and
- the generated phrase is for controlling the first device based on the acquired user setting including the phrase information.

12. The terminal device according to claim 11, wherein:
- the recognition device is settable by the user so that any one of a first type of phrase or a second type of phrase is acceptable, the first type of phrase containing an identification name for identifying a system configured to acquire an operation instruction generated by the recognition device to control the first device, and the second type of phrase being inhibited from containing the identification name, and
- the generated phrase is for controlling the first device based on whether each of the first type of phrase and the second type of phrase is acceptable.

* * * * *